US 9,830,126 B2

(12) United States Patent
Alders (10) Patent No.: US 9,830,126 B2
(45) Date of Patent: Nov. 28, 2017

(54) CONTROLLING AUDIO PLAYBACK BASED ON ACTIVITY

(71) Applicant: Bose Corporation, Framingham, MA (US)

(72) Inventor: Jamie Alders, Dover, MA (US)

(73) Assignee: Bose Corporation, Framingham, MA (US)

( * ) Notice: Subject to any disclaimer, the term of this patent is extended or adjusted under 35 U.S.C. 154(b) by 23 days.

(21) Appl. No.: 14/919,360

(22) Filed: Oct. 21, 2015

(65) Prior Publication Data

US 2017/0115953 A1    Apr. 27, 2017

(51) Int. Cl.
G06F 17/00 (2006.01)
G06F 3/16 (2006.01)
G05B 13/02 (2006.01)
G06N 5/04 (2006.01)

(52) U.S. Cl.
CPC ......... *G06F 3/165* (2013.01); *G05B 13/0205* (2013.01); *G06N 5/04* (2013.01)

(58) Field of Classification Search
CPC ...................................................... G06F 3/165
See application file for complete search history.

(56) References Cited

U.S. PATENT DOCUMENTS

| 9,177,052 B2 | 11/2015 | Gomes-Casseres et al. |
| 9,330,169 B2 | 5/2016 | Gomes-Casseres et al. |
| 2010/0023544 A1* | 1/2010 | Shahraray ............ G11B 27/034 707/E17.009 |
| 2011/0301728 A1* | 12/2011 | Hamilton ............. G11B 27/034 700/94 |
| 2013/0253679 A1* | 9/2013 | Lambourne ............. H04R 3/12 700/94 |
| 2014/0281976 A1* | 9/2014 | Chia ................. G06F 17/30873 715/716 |
| 2014/0298169 A1* | 10/2014 | Williams ......... H04N 21/25841 715/716 |
| 2015/0254051 A1* | 9/2015 | Panguluri ................ G06F 3/16 700/94 |
| 2016/0210114 A1 | 7/2016 | Gomes-Casseres et al. |

* cited by examiner

*Primary Examiner* — Joseph Saunders, Jr.
(74) *Attorney, Agent, or Firm* — Fish & Richardson P.C.

(57) ABSTRACT

Example systems may perform operations for: receiving, information about an activity scheduled for a user of an audio playback device; determining a timing associated with the activity based on the information; determining that audio content is being played on the audio playback device at the time of the activity; and controlling playback of the audio content on the audio playback device based on the timing to alert the user of the activity.

19 Claims, 6 Drawing Sheets

CONTROLLING AUDIO PLAYBACK BASED ON ACTIVITY

TECHNICAL FIELD

This specification relates generally to controlling audio playback on one or more devices based on activity of a user.

BACKGROUND

Electronic notifications can be used to remind a user about an event, such as meeting, or to provide a user with other information, such as breaking news. These notifications are typically displayed on a device, such as a smartphone. These notifications can take various forms. For example, they often include a pop-up display, along with a sound alert, which are presented simultaneously. The notifications may be triggered by events on the user's electronic calendar or by an application ("app") running on the user's device.

SUMMARY

Example systems may perform operations for: receiving, information about an activity scheduled for a user of an audio playback device; determining a timing associated with the activity based on the information; determining that audio content is being played on the audio playback device at the time of the activity; and controlling playback of the audio content on the audio playback device based on the timing to alert the user of the activity. The example systems may include one or more of the following features, either alone or in combination.

Receiving the information may include: interfacing with an electronic calendar for the user; and obtaining the information from the electronic calendar. Controlling the playback of the audio content may include interrupting the playback at least at a point in time when the activity is to occur. Controlling the playback of the audio content may include changing a volume of the audio content at least at a point in time when the activity is to occur. Controlling the playback of the audio content may include changing the audio content from a first selection to a second selection at least at a point in time when the activity is to occur.

The audio playback device may be among one of multiple audio playback devices that are controlled based on the timing to alert the user of the activity, with the multiple audio playback devices being synchronized for concurrent playback of the audio content. The audio playback devices may include one or more of: headphones, a stand-alone speaker, a smartphone, a media player, a smartwatch, or a stereo system. The example system may include identifying the user of the audio playback device, with controlling playback of the audio content being customized based on an identity of the user.

Example systems may perform operations for: obtaining information about a duration of an activity for a user of an audio playback device; determining selections of audio content that, taken together, have a duration that is within a predefined range of the duration of the activity; detecting an input indicative of a beginning of the activity; and triggering playback, on the audio playback device, of the selections of audio content in response to the input. The example systems may include one or more of the following features, either alone or in combination.

Obtaining the information may include: interfacing with a system that employs global positioning to determine a distance between locations and that determines travel time based on the distance, with the travel time corresponding to the duration; and requesting the information from the system. Obtaining the information may include: interfacing with a system that employs global positioning to determine a distance between locations; and estimating a travel time based on the distance between the locations, with the travel time corresponding to the duration.

The example system may include arranging playback of one or more selections on the audio playback device based on a time during the duration of the activity; and/or controlling playback of the selections on the audio playback device based on a time during the duration of the activity. Controlling the playback of the selections may include changing a volume of audio content based on the time.

Example systems may perform operations for obtaining an estimate of a duration of an activity for a user of an audio playback device, with the activity being travel between two locations, and with obtaining the information including: interfacing with a system that employs global positioning to determine a distance between the two locations; estimating a travel time based on the distance between the locations; and assigning the travel time as the duration. The example systems may perform operations for determining selections of audio content that, taken together, have a duration that is within a predefined range of the duration of the activity; detecting an input indicative of a beginning of the activity, where detection of the input includes employing global positioning to detect movement that is the beginning of the activity; and triggering playback, on the audio playback device, of the selections of audio content in response to the input.

Any two or more of the features described in this specification, including in this summary section, can be combined to form implementations not specifically described herein.

The systems and techniques described herein, or portions thereof, can be implemented as/controlled by a computer program product that includes instructions that are stored on one or more non-transitory machine-readable storage media, and that are executable on one or more processing devices to control (e.g., coordinate) the operations described herein. The systems and techniques described herein, or portions thereof, can be implemented as an apparatus, method, or electronic system that can include one or more processing devices and memory to store executable instructions to implement various operations.

The details of one or more implementations are set forth in the accompanying drawings and the description below. Other features and advantages will be apparent from the description and drawings, and from the claims.

DETAILED DESCRIPTION

Described herein are example processes for controlling playback of audio based on activity of a user. For example, audio playback on one or more audio playback devices may be triggered or altered based on user activity. User activity may be determined in real-time, based on user input, based on events in one or more electronic calendars, or using any other appropriate information.

Figure 1:
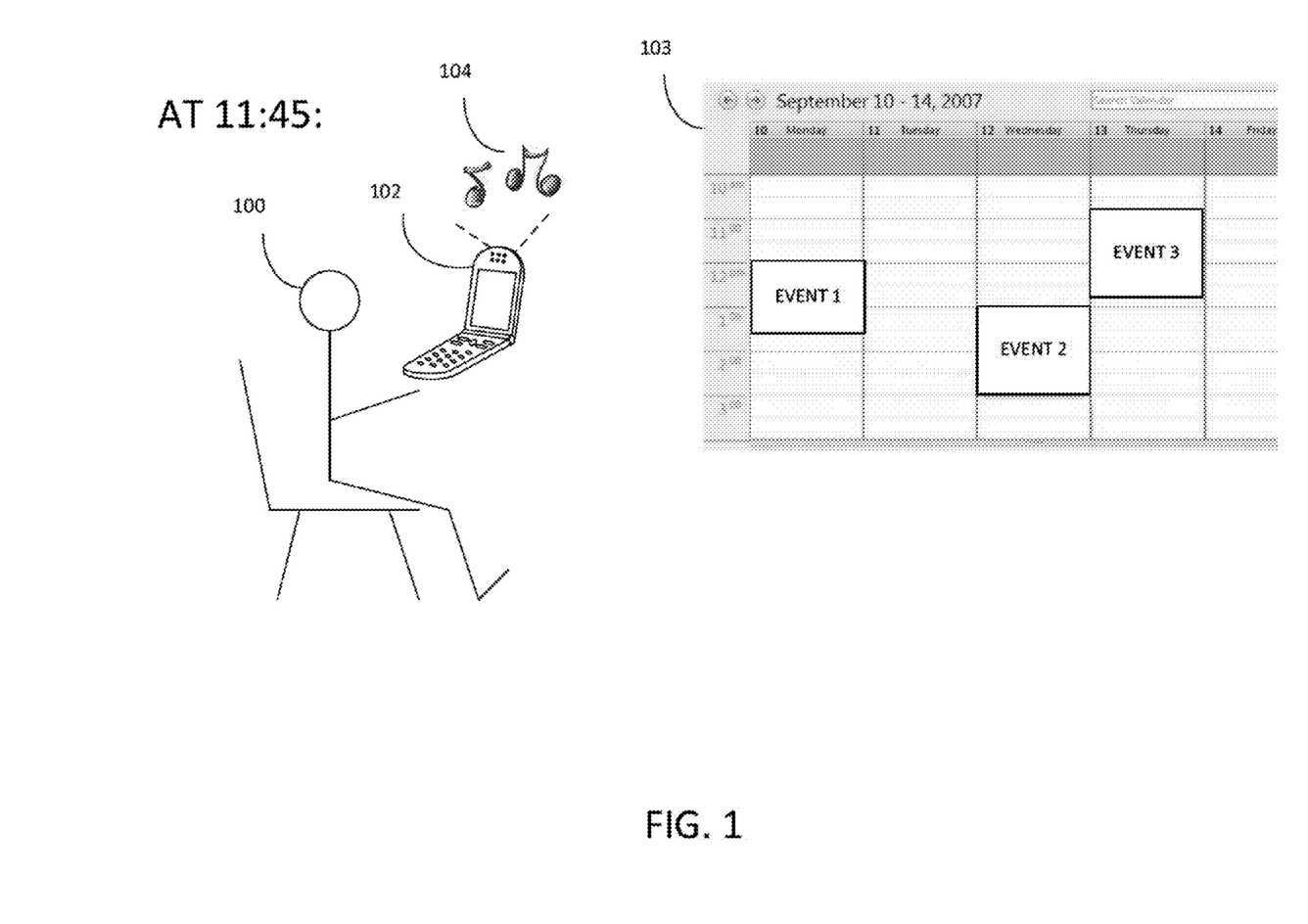
FIGS. 1 and 2 are a block diagrams showing, conceptually, controlling audio playback on a device based on activity of a user.
Figure 2:
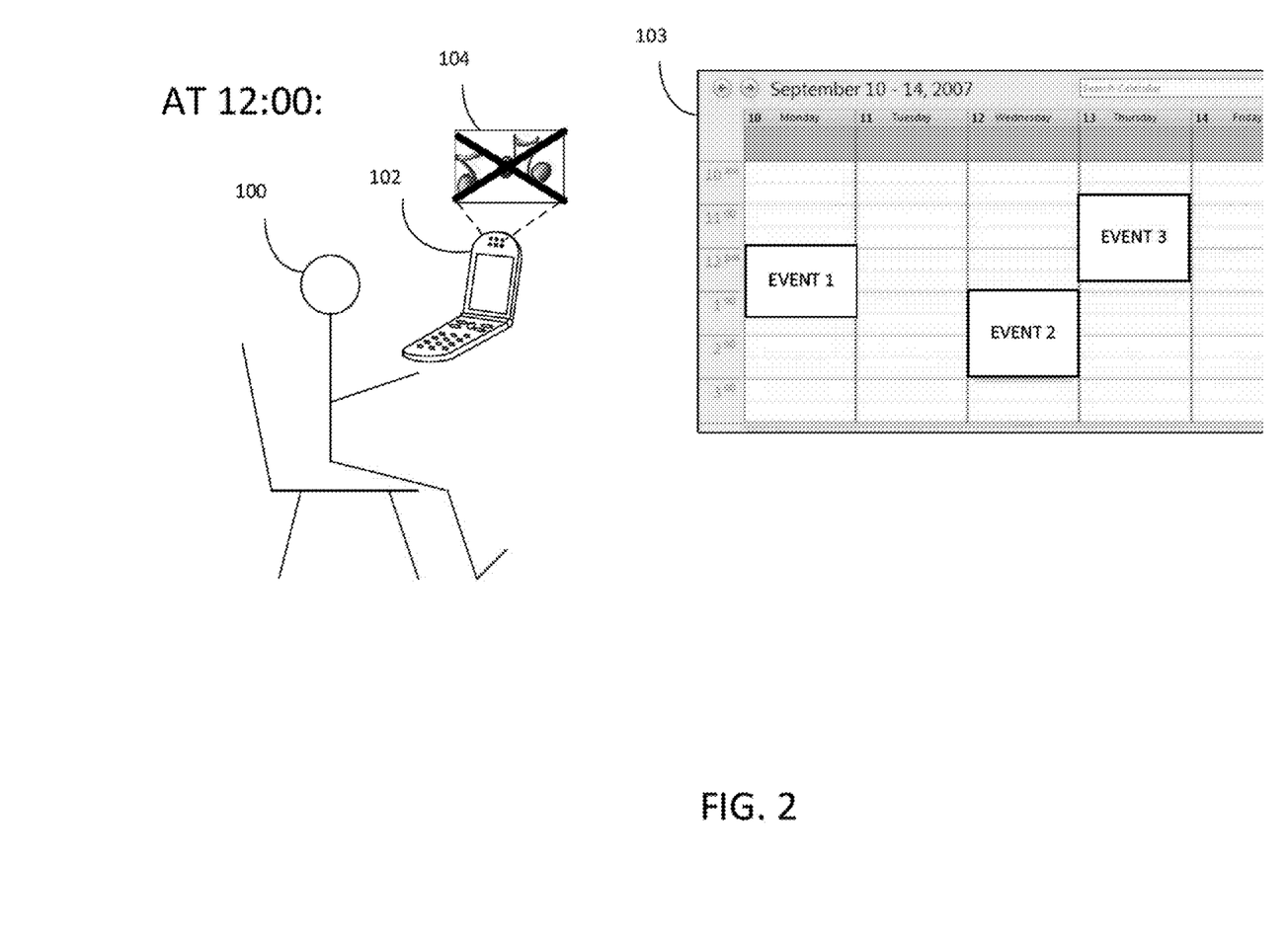

In an example implementation, as shown in FIGS. 1 and 2, a user 100 may listen to audio 104 on a cellular telephone 102. The user's electronic calendar 103 may indicate that the user has an event (e.g., a meeting) at 12:00 Eastern time. The processes may detect the calendar event, and alter audio playback on the cellular telephone at an appropriate time in order to alert the user of the meeting. For example, the system may control cellular telephone 102 to stop playback of audio at 11:55 Eastern, to change the content of currently playing audio, to stop currently playing audio, to change the volume of currently playing audio, or to perform any other appropriate control over the audio playback to alert the user of the meeting. In some implementations, the processes may begin playback of audio on a home audio system or other device to alert the user of an event. In the example of FIGS. 1 and 2 audio is playing at 11:45, and has been interrupted by 12:00. The crossed-out audio 104 of FIG. 2 indicates that that the audio has stopped at 12:00.

In another example implementation, the processes may determine an expected duration of an activity, and control audio playback based on the duration. For example, the user may provide information indicating that the user is traveling, by car, between Boston and New York. Based on this information, the processes may determine that the duration of the trip is about four hours, and select audio (e.g., songs) to create a playlist that is about four hours long. The processes may begin playback on the car's stereo system when the trip starts, and stop playback at about when the trip stops. The processes may also implement other controls, such as lowering the audio volume during driving through metro areas. In some implementations, the processes may download the playlist for offline playback.

Other example implementations are described below.

Figure 3:
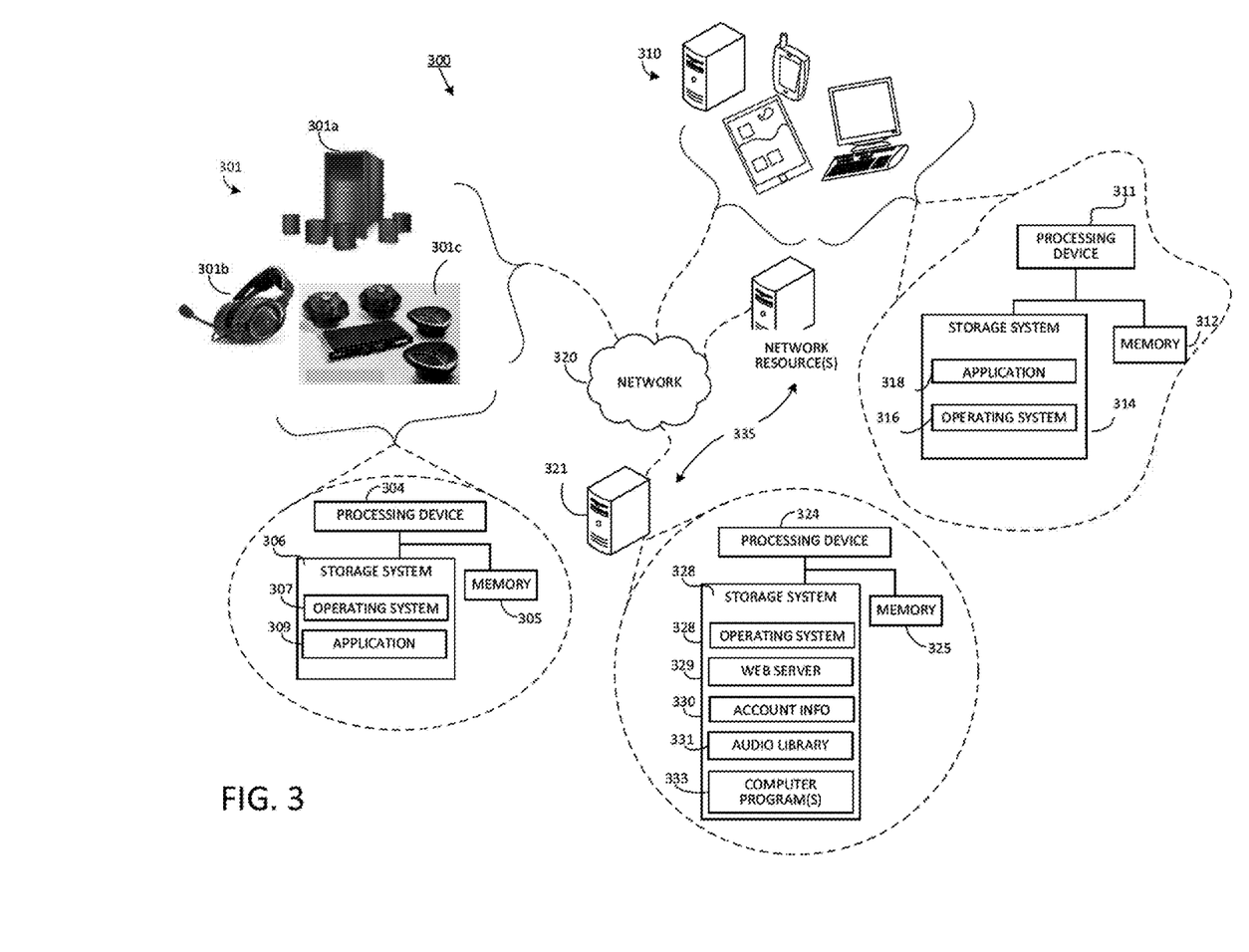
FIG. 3 is a block diagram showing an example of a network on which the processes described herein may be implemented.

FIG. 3 is a block diagram of an example of a system 300 on which the process described herein may be implemented. System 300 includes one or more audio systems 301. Each audio system 301 is configured to generate, and to render (e.g., play), sounds based on audio information represented by digital or analog signals. Audio systems 301 may be, or include, any appropriate audio playback system, such as an in-home audio system 301a, a personal audio system 301b, and/or a car audio system 301c. Although headphones are shown, examples of a personal audio system may include, but are not limited to, personal media players such as MP3 players, cellular telephones such as smartphones, tablet computers, headphones, and smart watches or other wearable computing devices. Although a home theater system is shown, examples of in-home audio systems may include, but are not limited to, home theater systems, stereo systems, stand-alone speakers, televisions such as smart televisions, gaming systems, and home entertainment systems that are usable with our without a televisions or stereo connection. Although a car stereo is shown, examples of car audio systems may include, but are not limited to, compact disc or digital video disc players, radios, including satellite or non-satellite radios, and so forth.

In some implementations, each audio system is controlled by a remote computing device. For example, analog or digital signals may be sent from the computing device to the audio system. Some of those signals may be used to control the audio system, and some of those signals may be translated into sound for playback. In some implementations, the audio system has minimal or no on-board intelligence. In some implementations, the audio system may include computing functionality and on-board intelligence. For example, in some implementations, an audio system 301 may include one or more processing devices 304, memory 305, and a storage system 306. Storage system 306 can store an operating system (OS) 307, and computer programs, such as application 309. Application 309 may include executable code for interacting with one or more computing devices and/or local or remote services that provide access to one or more user audio libraries and/or one or more user electronic calendars.

An audio system may be separate from, incorporated into, and/or controlled by one or more computing devices. Examples of computing devices include, but are not limited to, a mobile computing device such as a cellular telephone (e.g., a feature phone or a smartphone), a desktop computer, a laptop computer, a handheld computer, a tablet computer, a network appliance, a camera, an enhanced general packet radio service (EGPRS) mobile phone, a media player, a navigation device, an electronic mail (e-mail) device, a game console, an electronic reader, a smartwatch, or a combination of any two or more of these data processing devices or other data processing devices. In some implementations, the computing device can be included as part of a motor vehicle.

In examples that follows, control functions are implemented using a computing device 310, such as a smartphone, and audio playback is performed on a separate audio system 301, such as headphones. However, both control and playback functions may be implemented on the same device, particularly where that device has both audio playback capabilities and on-board intelligence, including processing or communication capabilities. In some implementations, control and playback functions may be implemented through one or more intermediary computing devices, such as a Web server, that interact with both the computing device and the audio system to implement the processes described herein.

A computing device 310 may include one or more processing devices 311, memory 312, and a storage system 314. Storage system 314 can store an operating system (OS) 316, and computer programs, such as application 318. Application 318 includes executable code for interacting with a local or remote service, such as an audio library and an electronic calendar. Computing device 310 may be connected, through one or more computer networks 320, to one or more such systems or services, from which information is obtained for use in controlling audio playback according to the processes described herein. For example, computing device 310 may be connected, via network 320, to an online or network-accessible user calendar and/or audio library residing on one or more servers 321.

Network 320 represents a communications network that can allow devices (e.g., computing device 310) to effect wired or wireless communication through a communication interface (not shown), which may include digital signal processing circuitry, where necessary. Network 320 can include one or more networks available for use by the computing devices. The network(s) may provide for communications under various modes or protocols, such as Internet Protocol (IP), Global System for Mobile communication (GSM) voice calls, Short Message Service (SMS), Enhanced Messaging Service (EMS), Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. In an example, network communication may occur through a radio-frequency transceiver. In addition, short-range communication may occur between devices, such as using a Bluetooth®, Wi-Fi, or other such transceiver-based communications.

An electronic calendar may be stored locally, either on a computing device or on an audio system. Likewise, an audio library may be stored locally, either on the computing device or on the audio system. Alternatively, the electronic calendar and audio library may be stored remotely, e.g., on a Web server on network 320. An example server in which the electronic calendar and/or audio library may be stored includes server 321. Server 321 can represent various forms of servers, such as a Web server, an application server, a proxy server, a network server, or a server farm. Server 321 may also include, or be associated with, one or more data repositories (not shown separately) for storing information regarding audio tracks, audio track libraries, data tables, and other information that is usable by to provide audio content responsive to a request from a computing device or audio system.

Server 321 can include one or more processing devices 324, memory 325, and a storage system 326. Storage system 326 can store an operating system (OS) 328 and a Web server program 329 for enabling access to music, such as a user's music library or a music service (e.g., a streaming service or service that allows purchase and download of content). In an example, the music service may be accessible via a Web site, and may include user account information 330 and an audio library 331 for the user account. User account information 330 may include, e.g., settings associated with a user's account, such as access information, and other user account-specific data. Audio library 331 may include audio tracks that the user has uploaded, or that are otherwise available to the music service. Audio tracks and associated information (e.g., metadata) may be stored in a database, and indexed to the user's account. In some implementations, server 321 may include one or more computer programs 333 comprised of instructions that are executable to interact with a computing device and audio system to perform at least part of the processes described herein for controlling audio based on an activity.

Network resources 335 may also include, for example, Web sites, file servers, or other sources that provide information about audio content. The information about may include, for example, information about artists, audio tracks, genres, publishers, albums, and so forth. This information may be obtained, e.g., by scraping in the case of public domain information or by licensing in the case of proprietary information. The obtained information may include metadata, and may be stored in tables in a database for the audio library in association with corresponding audio track(s). The information may form the basis of tags that may be used by to generate playlists for use as described below.

Figure 4:
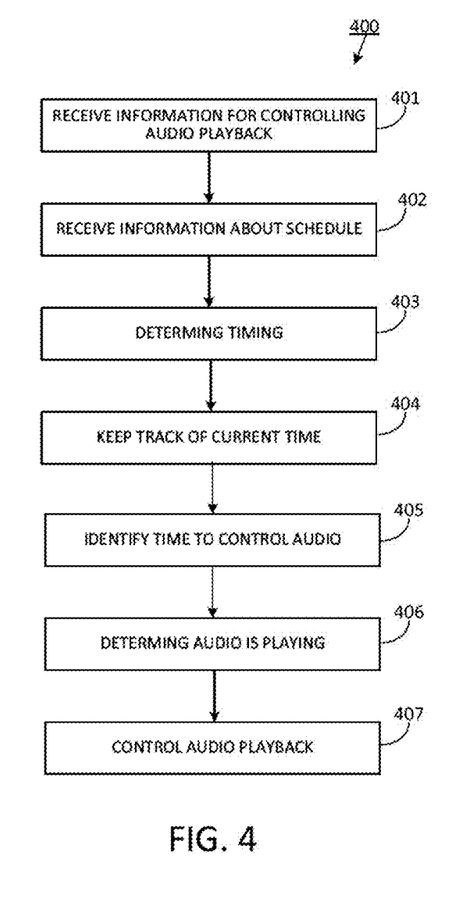
FIG. 4 is a flowchart of an example process for controlling audio playback on one or more devices based on activity of a user.

FIG. 4 shows an example process 400 for controlling audio playback on one or more audio playback devices (e.g., audio systems 301) based on activity of a user. Process 400 may be implemented using computing device 310 in combination with an audio system 301 and/or one or more servers (e.g., server 321) on the network. For example, process 400 may access a user calendar, audio (e.g., music), and information about the audio, from either local or remote storage. Process 400 may perform the operations described below either to control audio playback on the same device on which the process is performed, or on another device. For example, process 400 may be performed on a computing device to stream music, when appropriate, to an audio system of the type described herein.

According to process 400, information is received (401) for controlling audio playback in response to an activity, such as a calendar event. For example, a user may access a computer program that is either local (e.g., on the computing device) or remote (e.g., a Web site) to provide that computer program with the information that is needed to control audio playback. In some implementations, computing device 310 generates data for use in rendering one or more graphical user interfaces (GUIs) on a display device. The GUIs allow a user to provide input to control the audio system through any appropriate computing device. For example, the GUIs may allow a user to control how audio playback is to occur in response to an activity, such as a calendar event. The GUIs may allow a user to create a playlist appropriate for the duration of an activity, and to control how that playback of songs on that playlist progresses during the duration. Thus, the GUIs may allow the user to input instructions as to how the audio is to be controlled, and also allow the user to input information about which audio is to be controlled. For example, the user may specify that the audio is to start, stop, change track, increase in volume, or the like. The user may also specify which track(s) are to play, when those tracks are to play, and which operations are to be performed vis-à-vis those tracks for an activity.

The GUIs may also receive, and request, information needed to access a user's calendar or other schedule. For example, if any passwords, usernames, or the like are required, this information may be input, and used by process 400 to access the user's calendar or other schedule. In an implementation, process 400 may use a Web service and appropriate application programming interface (API) to access a user's remote calendar using the information input on the GUIs. Alternatively, process 400 may access the user's calendar in local storage.

According to process 400, information is received (402) about an activity scheduled for a user of an audio playback device (examples of which include the audio systems described herein). For example, process 400 may interface with the user's electronic calendar, whether it be stored locally or remotely (e.g., on the computing device or on a remote server), and obtain information about the user's schedule, including events, from that calendar. In another example, rather than relying on a user calendar, the user may input information about upcoming events directly into a computer program that implements the process. For example, a GUI may include one or more fields that enable the user to input information to identify upcoming activities and to specify one or more audio playback operations that are to occur in response to those activities. For example, as above, the user may specify which audio track(s) are to play, when those tracks are to play, and which operations are to be performed vis-à-vis those tracks in response to the event.

Process 400 determines (403) a timing associated with an event (e.g., an activity, such as a meeting) based on information that process 400 receives from the user or the user's electronic calendar. For example, the information typically contains a time and date that an event is to occur. Process 400 keeps track of the current time (404) and identifies (405)

an appropriate time at which to control audio playback relative to the event. This time may be hard-coded in the computer program that implements process 400, or the time may be configured by a user in one of the GUIs. For example, in some implementations, the time at which the control takes place may be the time of the event. If a meeting is to take place at 5:00, then audio may be turned off or on at 5:00. Alternatively, in some implementations, the audio may be controlled a predefined time before an event is to occur (e.g., five minutes, ten minutes, fifteen minutes, etc. before the event). In some implementations, the audio may be controlled differently over a course of time near to, and including, the event. For example, at some time before the event (e.g., five minutes before), the volume of the audio may increase or decrease until it reaches a predefined maximum or minimum value at the time of the event. Likewise, as the time for the event passes, the audio may increase or decrease to indicate that the time has passed. For example, five minutes before an event, the volume of audio may be decreased, reaching a zero volume at the time of the event, and slowly increase thereafter to indicate that that the time of the event has passed.

As indicated above, in some implementations, process 400 may turn audio on in response to an event. In some implementations, process 400 may determine (406) that audio is being played on the audio playback device at the time of the activity or at a predefined time prior to the event. This determination may be made via communication with the audio playback device, communication with the user, or through any other appropriate processes. In response to this determination, as described herein, process 400 controls (407) playback of the audio on an audio playback device based on the timing to alert the user of the event. Examples of controlling audio have been described above, and include starting and stopping audio playback at appropriate time(s). Controlling audio may also include, but is not limited to, interrupting playback at least at a point in time when the activity is to occur (e.g., before, during, and/or after the activity), and changing a volume of the audio content at least at a point in time when the activity is to occur (e.g., before, during, and/or after the activity). In some implementations, controlling the playback of the audio may include changing the audio content from a first selection (e.g., a first track) to a second selection (e.g., a second track) at least at a point in time near to when the activity is to occur (e.g., before, during, and/or after the activity). The user may specify which track is to be played at about the point in time of the activity, or process 400 may change tracks randomly.

In this regard, process 400 may identify the user of an audio playback device, based, e.g., on information available from the device, such as a user identifier, input account information, network address, or other appropriate available identifying information, and, as described herein, customize control of audio playback based on the identity of the user. For example, the user may specify audio tracks to play at particular activities, control the timing of audio playback, or the like.

In some implementations, a user's computing device may control multiple audio playback devices concurrently. For example, the user's computing device may include an application to play audio directly from on-board speakers. In addition, the user's computing device may output audio to, or control, the user's headphones, the user's home theater system, the user's car stereo, and any other appropriate audio device of the user. These devices may be connected to the user's computing device, e.g., through a network and/or other wireless connection, such as Bluetooth®. Such devices may be registered with process 400 or discovered by process 400, e.g., through any appropriate protocol. In any event, process 400 may synchronize audio control over all registered user audio playback devices so that the appropriate control is experienced at, or about, the same time, on all registered user audio playback devices. For example, in response to a calendar event, audio may be interrupted, stop, start, or change, at the same time on the user's headphones, the user's home theater system, the user's car stereo, and the user's smartphone. Control signals may be sent, via appropriate electronic media, from the user's computing device (or a remote server) to the user playback devices.

In some implementations, audio playback may be controlled to coincide with the duration of an activity. For example, a user may be scheduled to travel, by car, from one location (e.g., Boston) to another location (e.g., New York). The point of origin and the destination may be obtained directly from the user, from the user's calendar, or from any other appropriate public or private source (assuming appropriate user permission is obtained). The audio may be controlled, e.g., according to process 400, so that changes thereto coincide with the trip.

Figure 5:
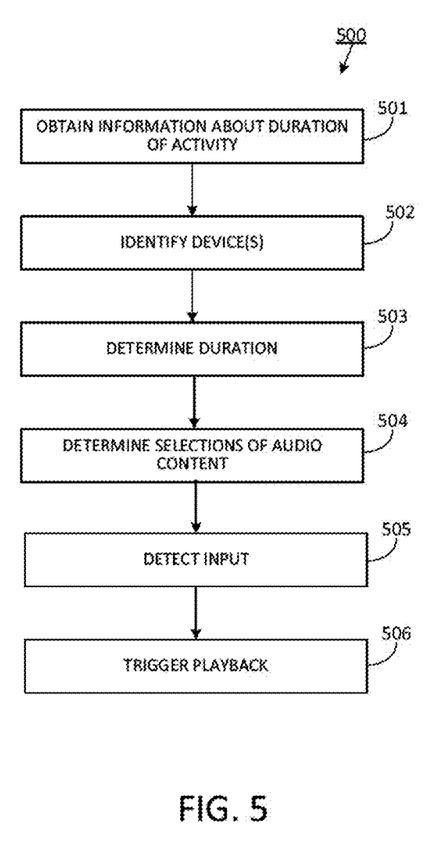
FIG. 5 is a flowchart of another example process for controlling audio playback on one or more devices based on activity of a user.

In this regard, FIG. 5 shows an example process 500 for controlling audio playback on one or more devices based on the duration of a user's activity. Process 500 may be implemented using computing device 310 in combination with an audio system 301 and/or one or more servers (e.g., server 321) on a network. For example, process 500 may access a user calendar and audio (e.g., music) from either local or remote storage. Process 500 may perform the operations described below either to control audio playback on the same device on which the process is performed, or on another device. For example, process 500 may be performed on a computing device to stream music, when appropriate, to an audio system of the type described herein.

In an example implementation, process 500 obtains (501) information about the duration of an activity for a user of an audio playback device. For example, as described herein, process 500 may obtain this information from the user's electronic calendar or obtain this information directly from the user. Process 500 may also identify (502) one or more devices that will be in use during the duration. For example, process 500 may query the user (e.g., through a GUI, notification, or other appropriate communication method) or attempt to determine the appropriate audio playback device to control. For example, if process 500 determines that the user is driving between two locations, process 500 may infer that the appropriate device to control is the user's car stereo. Other user audio playback devices may also be controlled concurrently if concurrent control is enabled by the user and/or the devices on which process 500 are implemented are so configured.

In process 500, any appropriate type of control may occur during the duration of the event, such as those described herein. For example, at the beginning of an activity, audio may begin playing, and that audio may be played until the end of the activity. Likewise, audio tracks may be changed, stopped, interrupted, changed in volume, and so forth, depending upon how the controls are configured.

In some implementations, process 500 determines (503) a duration of an activity. For example, the duration may be specified directly by the user or it may be determined based on content of the user's electronic calendar. In some implementations, the user may access remote services, such as a geographic or mapping services to determine an expected duration of an event. For example, if the user's calendar indicates a drive from Boston to New York, process 500 may consult an online geographic or mapping service to obtain an expected travel time, and use that expected travel time as the duration of the event. Such services can be advantageous in that they may be able to take into account factors, such as traffic, in making an estimate of the expected travel time. In some implementations, process 500 may make its own estimate of the expected event duration based on information provided by the user, the user's calendar, and/or network services. For example, in a case where a network service employs global positioning to determine a distance between locations, process 500 may simply request and receive a travel time between two specified locations. Alternatively, process 500 may specify two locations to a global positioning service, and estimate the time based on the distance between those two locations returned by the global positioning service.

Process 500 determines (504) selections of audio content that, taken together, have a duration that is within a predefined range of the duration of the event. For example, process 500 may use metadata associated with tracks in a user's music library or a music library at a remote server to select tracks, and to generate a playlist, that has a duration that is about equal to the duration of the event. Process 500 may also select the content of tracks based, e.g., on user input, the locations between which the user is traveling, and the speed of travel (if available, e.g., from global positioning information from a user's smartphone). For example, if the user is traveling between Boston and New York, the playlist generated for the duration of the activity may begin with "Dirty Water" (a Boston-specific song) and end with "New York State of Mind" (a New York-specific song). The resulting playlists may be downloaded to the audio system or streamed from a remote source.

The time during travel may dictate when particular tracks are played and the when controls implemented. For example, the volume of music may be lower at the start and end of a trip, and higher mid-trip. Likewise, information from a user's smartphone may also be used to control audio playback. For example music volume may be controlled based on whether a user is driving in a metro area, e.g., if the user is driving through Hartford on the way between Boston and New York, the volume of the music may be lowered while the user is in Harford, and increased when the user leaves Harford.

As shown in FIG. 5, process detects (505) an input indicative of the beginning of the activity. For example, the input may be information input into a GUI by the user (e.g., selecting a "start" button), or the input may be inferred from other information. For instance, global positioning system (GPS) information (e.g., from a user's smartphone) combined with calendar information may be inputs that indicate that a trip has begun, triggering playback. In some implementations, the time may be the input that indicates that the trip has begun, triggering playback (e.g., the current time matches the beginning time of the trip indicated on the user's calendar).

Following receipt of the input, playback of audio is triggered (506), as described herein. Audio playback during the activity (in this case, the trip) may be controlled according to any appropriate technique described herein. For example, process 500 may control the audio to start, stop, change track, increase in volume, or the like in response to any appropriate event, such as user input or an estimated end of the trip. As described herein, in some implementations, such controls may be synchronized to all audio playback devices or may be limited to the particular device that is in expected to be in use (e.g., the user's car stereo during a car trip).

Figure 6:
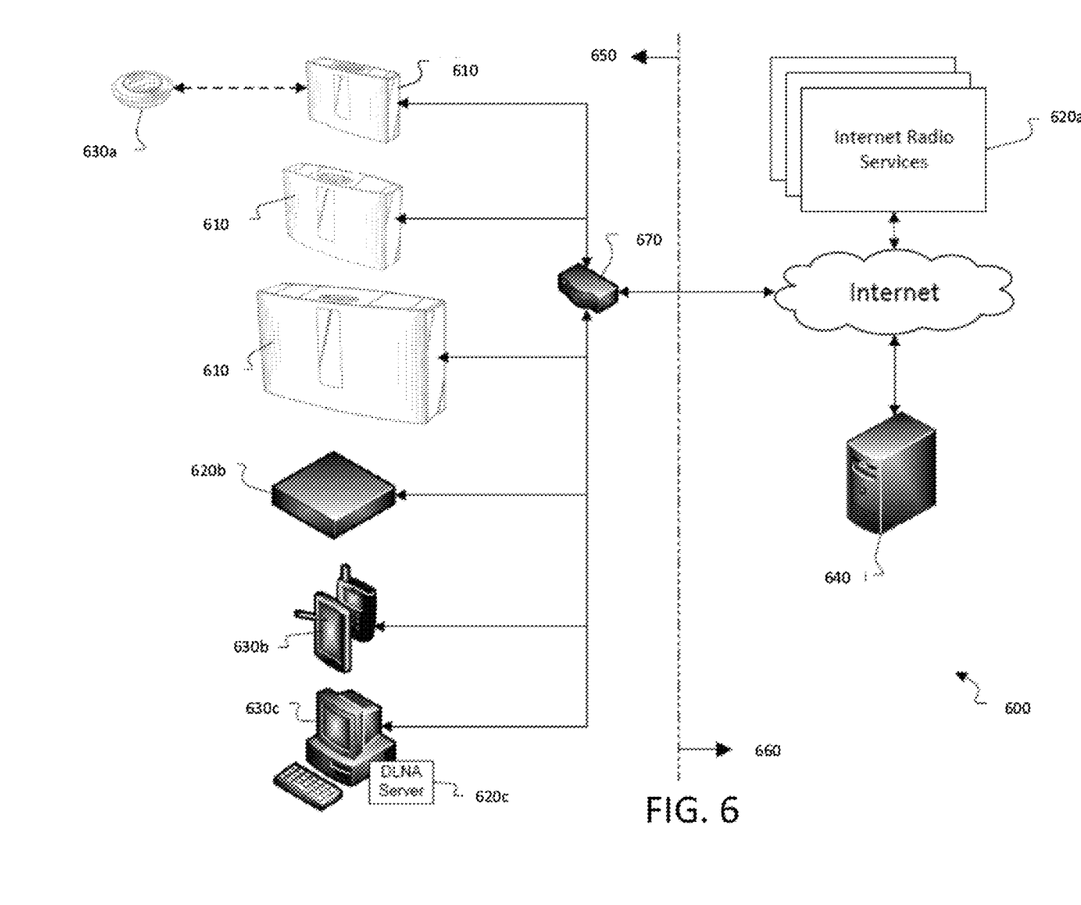
FIG. 6 is a block diagram showing an example of a networked audio system on which the processes described herein may be implemented.

Processes 400 and 500 may be implemented on any appropriate audio system, including those described above. FIG. 6 shows another example of a networked audio system on which the processes described herein may be implemented. In this example, at a high level, there are four main categories of devices in the audio system 600: (i) audio playback devices 610; (ii) digital audio sources 620a, 620b, 620c (collectively referenced as 620); controllers 630a, 630b, 630c (collectively referenced as 630); and a server 640.

The audio playback devices 610 are electronic devices which are capable of rendering audio content. These devices can access stored audio content (e.g., remotely stored audio content) and stream it for playback. In some cases, the audio playback devices 610 may also be capable of playing locally stored content. These devices render audio with the help of audio codecs and digital signal processors (DSPs) available within. Playback of audio on audio playback devices 610 may be controlled based on an activity according to any of the processes described herein.

The audio playback devices 610 can communicate with each other. For example, each audio playback device 610 can communicate with the other audio playback devices 610 within the audio system 600 for synchronization. This can be a synchronization of device settings, such as synchronization of preset assignments, or, for synchronization of playback (e.g., such that all or a subset of the audio playback devices 610 play the same content simultaneously and synchronously).

The digital audio sources 620 are devices and/or services that provide access to one or more associated entities for supplying content (e.g., audio streams) to the audio playback devices 610, and which can be located remotely from the audio playback devices 610. An "entity," as used herein, refers to a grouping or collection of content for playback. Exemplary entities include Internet radio stations and user defined playlists. "Content" is data (e.g., an audio track) for playback. "Associated entity" refers to an entity that is associated with a particular audio source. For example, if the digital audio source 620 is an Internet music service such as Pandora®, an example associated entity would be a radio station provided by Pandora®. Digital audio sources 620 are sources of audio, the playback of which may be controlled according to the processes described herein.

For the purposes of the audio system 600, audio streams are considered to be data. They are processed as digital information that is converted to analog before presentation. Data streaming is the method by which data is moved from an audio source 620 to an audio playback device 610. Typically, there are two models for this data movement, push and pull. The audio system 600 is capable of managing this audio (data) streaming in both fashions; descriptions of these processes are as follows.

In a push model, the digital audio source 620 will move the data to the audio playback device 610 at a pace that it desires. The recipient (e.g., one of the audio playback devices 610) of the data will acknowledge the data and the digital audio source 620 will provide more data. This model requires the digital audio source 620 to be managing the throughput characteristics of the audio system 600. In a pull model, the audio playback device 610 will request data from the digital audio source 620 at a rate it desires. This allows the audio playback device 610 to read ahead if data is available.

The digital audio sources 620 each maintain a repository of audio content which can be chosen by the user to play. The digital audio sources 620 can be based on the Digital Living Network Alliance® (DLNA) or other Web based protocols similar to the Hypertext Transfer Protocol (HTTP). Some of the devices and services in this category include Internet based music services 620a such as Pandora®, Spotify®, and vTuner®; network-attached storage (NAS) devices 620b, and a media server daemon 620c (e.g., provided as a component of a computer-based controller).

The digital audio sources 620 include user defined playlists of digital music files available from network audio sources such as network-attached storage (NAS) devices 620b, and a DLNA server 620c which may be accessible to the audio playback devices 610 over a local area network such as a wireless (Wi-Fi) or wired (Ethernet) home network 650, as well as Internet radio sites 620a such as Pandora®, vTuner®, Spotify®, etc., which are accessible to the audio playback devices 610 over a wide area network 660 such as the Internet.

The controllers 630 are responsible for controlling the audio playback devices 610 and for browsing the audio sources 620 in the audio system 600. Controllers 630 are examples of computing devices that may be used to control playback of audio according to the processes described herein.

Controllers 630 include, but are not limited to, desktop computers, laptop computers, and mobile devices such as smart phones and tablets. These devices control the audio playback devices 610 via a wireless communication interface (e.g., IEEE 802.11 b/g/n/ac, Bluetooth LE, infrared, etc.). The controllers 630 serve as an online management tool for a user's network enabled audio playback devices 610. The controllers 630 provide interfaces which enable to the user to perform one or more of the following: setup a connection to a Wi-Fi network; create an audio system account for the user, sign into a user's audio system account and retrieve information; add or remove an audio playback device 610 on a user's audio system account; edit an audio playback device's name, and update software; access the audio sources (via the audio playback devices 610); assign an entity (e.g., a playlist or radio station) associated with one of the audio sources 620 to a preset indicator; browse and select recents, where "recents" refers to recently accessed entities; use transport controls (play/pause, next/skip, previous), view "Now Playing" (i.e., content currently playing on an audio playback device 610) and album art; and adjust volume levels.

In some cases, the controllers 630 may include network controllers 630a, 630b and auxiliary controllers 630c. The network controllers 630a, 630b are controllers that communicate with the audio playback devices 610 over a wireless (Wi-Fi) network connection. The network controllers can include primary network controllers 630a and secondary network controllers 630b. The primary network controllers 630a can be utilized for: connecting an audio playback device 610 to a Wi-Fi network (via a USB connection between the audio playback device 610 and the primary network controller 630a); creating a system account for the user; setting up music services; browsing of content for playback; setting preset assignments on the audio playback devices 610; transport control (e.g., play/pause, fast forward/rewind, etc.) for the audio playback devices 610; and selecting audio playback devices 610 for content playback (e.g., single room playback or synchronized multi-room playback). Devices in the primary network controller category can include desktop and laptop computers.

The secondary network controllers 630b may offer some, but not all, of the functions of the primary network controllers 630a. For example, the secondary network controllers 630b may not provide for all of the account setup and account management functions that are offered by the primary network controllers 630a. The secondary network controllers 630b may be used for: music services setup; browsing of content; setting preset assignments on the audio playback devices; transport control of the audio playback devices; and selecting audio playback devices 610 for content playback: single room or synchronized multi-room playback. Devices in the secondary network controller category can include mobile devices such as smart phones and tablets.

The auxiliary controllers 630c communicate wirelessly (e.g., via Bluetooth low energy (BTLE) or IR) with an associated (e.g., paired) one of the audio playback devices (item 610, FIG. 6). The auxiliary controllers 630c may offer limited functionality. The auxiliary controllers 630c may be used for: browsing of content; setting of preset assignments on the associated one of the audio playback devices 610; and transport control (play/pause, etc.) of the associated audio playback device.

The server 640 is a cloud-based server which contains (e.g., within an account database) information related to a user's audio system account. This includes user account information such as the list of the audio playback devices 610 within the system 600, device diagnostic information, preset assignments, user audio preferences, etc. The server 640 will be connected to by the audio playback devices 640 and by the controllers 630 (e.g., by primary network controllers) for the purpose of preset management, as well as management of audio sources 620 and management of the user's audio system account. Generally, the controllers 630 (e.g., network controllers 630a, 630b) will login to the server 640 with a user's login details and 'sync down' the required information to work with.

The audio playback devices 610 and one or more of the controllers 630 are coupled to a local area network (LAN) 650. Other devices such as one or more of the digital audio sources (e.g., a network-attached storage (NAS) device 620b) may also be coupled to the LAN 650. The LAN 650 may be a wired network, a wireless network, or a combination thereof. In one example, the devices (e.g., audio playback devices 610 and controllers 630 (e.g., primary and secondary controllers 630a, 630b)) within the LAN 650 are wirelessly coupled to the LAN 650 based on an industry standard such as IEEE 802.11 b/g/n/ac. The LAN 650 may represent a network within a home, an office, or a vehicle. In the case of a residential home, the audio playback devices 610 may be arranged in different rooms (e.g., kitchen, dining room, basement, etc.) within the home. The devices within the LAN 650 connect to a user supplied access point 670 (e.g., a router) and subsequently to a wide area network (WAN) 660 (e.g., the Internet) for communication with the other digital audio sources 620 (Internet based music services 620a) and the server 640.

In the example audio system of FIG. 6, the controllers control operation of one or more of the audio playback devices according to processes 400 and/or 500. Remote servers may be sources of audio and/or information about audio. The remote servers may also be sources of other information, as described herein.

The systems and techniques described herein may be implemented and/or controlled using hardware or a combination of hardware and software. For example, a system like the ones described herein may include various controllers and/or processing devices located at various points. A central computer may coordinate operation among the various controllers or processing devices. The central computer, controllers, and processing devices may execute various software routines to effect control and coordination of testing and calibration.

The systems and techniques can be implemented as, or controlled, at least in part, using one or more computer program products, e.g., one or more computer program tangibly embodied in one or more information carriers, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the systems and techniques can be performed by one or more programmable processors executing one or more computer programs to perform the functions described herein. All or part of the systems and techniques can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A method comprising:
    receiving, by one or more processing devices, information about an activity scheduled for a user of an audio playback device, wherein receiving the information includes interfacing with an electronic calendar for the user, and obtaining the information from the electronic calendar;
    determining, by the one or more processing devices, a timing associated with the activity based on the information obtained from the electronic calendar;
    determining, by the one or more processing devices, that audio content is being played on the audio playback device at the time of the activity; and
    controlling playback of the audio content on the audio playback device based on the timing to alert the user of the activity, wherein controlling the playback of the audio content includes initiating a control of the playback at a predefined time before the activity, the predefined time being based on a first user-input received through a graphical user interface (GUI).

2. The method of claim 1, wherein controlling the playback of the audio content comprises interrupting the playback at least at a point in time when the activity is to occur.

3. The method of claim 1, wherein controlling the playback of the audio content comprises changing a volume of the audio content at least at a point in time when the activity is to occur.

4. The method of claim 1, wherein controlling the playback of the audio content comprises changing the audio content from a first selection to a second selection at least at a point in time when the activity is to occur.

5. The method of claim 1, wherein the audio playback device is among one of multiple audio playback devices that are controlled based on the timing to alert the user of the activity, the multiple audio playback devices being synchronized for concurrent playback of the audio content.

6. The method of claim 1, further comprising:
    identifying the user of the audio playback device;
    wherein controlling playback of the audio content is customized based on an identity of the user.

7. The method of claim 1, wherein the audio playback device comprises one or more of: headphones, a stand-alone speaker, a smartphone, a media player, a smartwatch, or a stereo system.

8. The method of claim 1, wherein a nature of the control of the playback is based on a second user-input received through the GUI.

9. The method of claim 8, wherein the second user-input specifies a volume level associated with the playback of the audio content during the activity.

10. A method comprising:
    obtaining, by one or more processing devices, information about an activity for a user of an audio playback device, wherein obtaining the information includes interfacing with an electronic calendar for the user, and obtaining the information from the electronic calendar;
    determining, by the one or more processing device, a duration of the activity based on the information obtained from the electronic calendar;
    determining, by the one or more processing devices, selections of audio content that, taken together, have a duration that is within a predefined range of the duration of the activity;
    receiving, at the one or more processing devices, an input comprising global positioning system (GPS) information;
    determining, by the one or more processing devices based on the GPS information and the information from the electronic calendar, that the activity has commenced; and
    responsive to determining that the activity has commenced, triggering playback, on the audio playback device, of the selections of audio content.

11. The method of claim 10, wherein determining the duration of the activity comprises:
   interfacing with a system that employs global positioning to determine a distance between locations and determines travel time between the locations based on the distance; and
   providing, to the system, an identification of a first location and a second location associated with the activity;
   obtaining, from the system, a travel time between the first location and the second location; and
   determining the duration of the activity based on the travel time between the first location and the second location.

12. The method of claim 10, further comprising:
   arranging playback of one or more selections on the audio playback device based on a time during the duration of the activity.

13. The method of claim 10, further comprising:
   controlling playback of the selections on the audio playback device based on a time during the duration of the activity.

14. The method of claim 13, wherein controlling the playback of the selections comprises changing a volume of audio content based on the time.

15. One or more non-transitory machine-readable storage media storing instructions that are executable by one or more processing devices to perform operations comprising:
   receiving information about an activity scheduled for a user of an audio playback device, wherein receiving the information includes interfacing with an electronic calendar for the user, and obtaining the information from the electronic calendar;
   determining a timing associated with the activity based on the information obtained from the electronic calendar;
   determining that audio content is being played on the audio playback device at the time of the activity; and
   controlling playback of the audio content on the audio playback device based on the timing to alert the user of the activity, wherein controlling the playback of the audio content includes initiating a control of the playback at a predefined time before the activity, the predefined time being based on a first user-input received through a graphical user interface (GUI).

16. One or more non-transitory machine-readable storage media storing instructions that are executable by one or more processing devices to perform operations comprising:
   obtaining information about an activity for a user of an audio playback device, wherein obtaining the information includes interfacing with an electronic calendar for the user, and obtaining the information from the electronic calendar;
   determining, by the one or more processing device, a duration of the activity based on the information obtained from the electronic calendar;
   determining selections of audio content that, taken together, have a duration that is within a predefined range of the duration of the activity;
   receiving, at the one or more processing devices, an input comprising global positioning system (GPS) information;
   determining, based on the GPS information and the information from the electronic calendar, that the activity has commenced; and
   responsive to determining that the activity has commenced, triggering playback, on the audio playback device, of the selections of audio content.

17. A system comprising:
   memory storing instructions; and
   one or more processing devices to execute the instructions to perform operations comprising:
      receiving information about an activity scheduled for a user of an audio playback device, wherein receiving the information includes interfacing with an electronic calendar for the user, and obtaining the information from the electronic calendar;
      determining a timing associated with the activity based on the information obtained from the electronic calendar;
      determining that audio content is being played on the audio playback device at the time of the activity; and
      controlling playback of the audio content on the audio playback device based on the timing to alert the user of the activity, wherein controlling the playback of the audio content includes initiating a control of the playback at a predefined time before the activity, the predefined time being based on a first user-input received through a graphical user interface (GUI).

18. A system comprising:
   memory storing instructions; and
   one or more processing devices to execute the instructions to perform operations comprising:
      obtaining information about an activity for a user of an audio playback device, wherein obtaining the information includes interfacing with an electronic calendar for the user, and obtaining the information from the electronic calendar,
      determining, by the one or more processing device, a duration of the activity based on the information obtained from the electronic calendar,
      determining selections of audio content that, taken together, have a duration that is within a predefined range of the duration of the activity,
      receiving, at the one or more processing devices, an input comprising global positioning system (GPS) information,
      determining, based on the GPS information and the information from the electronic calendar, that the activity has commenced; and
      responsive to determining that the activity has commenced, triggering playback, on the audio playback device, of the selections of audio content.

19. A system comprising:
   memory storing instructions; and
   one or more processing devices to execute the instructions to perform operations comprising:
      obtaining an estimate of a duration of an activity for a user of an audio playback device, the activity comprising travel between two locations, wherein obtaining the estimate comprises:
         interfacing with a system that employs global positioning to determine a distance between the two locations,
         estimating a travel time based on the distance between the locations, and
         assigning the travel time as the estimate of the duration,
      determining selections of audio content that, taken together, have a duration that is within a predefined range of the duration of the activity,
      receiving, at the one or more processing devices, an input comprising global positioning system (GPS) information, determining, based on detecting movement from the GPS information, that the activity has commenced, and responsive to determining that the activity has commenced, triggering playback, on the audio playback device, of the selections of audio content.

\* \* \* \* \*